United States Patent [19]
Naveh

[11] Patent Number: 5,708,251
[45] Date of Patent: Jan. 13, 1998

[54] METHOD FOR EMBEDDING RESISTANCE HEATING WIRE IN AN ELECTROFUSION SADDLE COUPLER

[75] Inventor: Nathan Naveh, Kfar Maas, Israel

[73] Assignee: Compucraft Ltd., Kfar Maas, Israel

[21] Appl. No.: 550,480

[22] Filed: Oct. 30, 1995

[51] Int. Cl.[6] .......................... B23K 26/10; H01C 17/00
[52] U.S. Cl. ................... 219/121.66; 219/121.85; 29/611; 156/272.8; 156/176
[58] Field of Search ................ 219/121.6, 121.66, 219/121.69, 121.85, 544; 29/611; 156/176, 272.8, 273.9, 293, 309.9, 272.2

[56] References Cited

U.S. PATENT DOCUMENTS

| | | |
|---|---|---|
| 3,520,053 | 7/1970 | Hinton et al. . |
| 3,523,363 | 8/1970 | Kuwayama et al. . |
| 3,626,143 | 12/1971 | Fry ........................ 219/121.69 |
| 3,769,125 | 10/1973 | Bethge ........................ 156/176 X |
| 3,778,898 | 12/1973 | Gruss et al. . |
| 3,781,983 | 1/1974 | Hiruma et al. . |
| 3,952,408 | 4/1976 | Docx . |
| 4,196,038 | 4/1980 | Chiba ........................ 156/433 |
| 4,207,672 | 6/1980 | Wohlert . |
| 4,420,876 | 12/1983 | McDermott . |
| 4,436,575 | 3/1984 | Dran et al. . |
| 4,446,360 | 5/1984 | Gellert . |
| 4,455,482 | 6/1984 | Grandclement . |
| 4,470,193 | 9/1984 | Karel et al. . |
| 4,555,834 | 12/1985 | Sichler . |
| 4,617,450 | 10/1986 | Boes et al. . |
| 4,622,087 | 11/1986 | Ansell . |
| 4,684,428 | 8/1987 | Ewen et al. . |
| 4,693,778 | 9/1987 | Swiggett et al. ........... 219/121.66 X |
| 4,727,242 | 2/1988 | Barfield . |
| 4,894,521 | 1/1990 | Evans . |
| 4,903,397 | 2/1990 | Freidel . |
| 4,933,037 | 6/1990 | de Jong . |
| 4,956,138 | 9/1990 | Barfield . |
| 5,096,632 | 3/1992 | Barfield . |
| 5,140,137 | 8/1992 | D'Auria ..................... 219/544 X |
| 5,369,874 | 12/1994 | McWilliams . |
| 5,378,305 | 1/1995 | Gillner et al. ............ 156/176 X |
| 5,387,305 | 2/1995 | Streng ..................... 156/272.2 X |

FOREIGN PATENT DOCUMENTS

| | | |
|---|---|---|
| 0 069 020 | 1/1983 | European Pat. Off. . |
| 0 184 658 | 3/1989 | European Pat. Off. . |
| 0453208 | 10/1991 | European Pat. Off. . |
| 1-206026 | 8/1989 | Japan . |
| 1-300943 | 12/1989 | Japan . |

*Primary Examiner*—Teresa J. Walberg
*Assistant Examiner*—Gregory L. Mills
*Attorney, Agent, or Firm*—Mark M. Friedman

[57] ABSTRACT

A method and apparatuses for embedding a resistance heating wire in a thermoplastic element having a surface such as an electrofusion saddle coupler by providing an operating head including heat grooving mechanism and wire inserting mechanism, the operating head and the thermoplastic element being integratively movable in all directions one relative to the other; using the heat grooving mechanism and the relative movement for creating a groove in the surface of the thermoplastic element; and, thereafter using the wire insertion mechanism and the relative movement for inserting the resistance heating wire into the groove, to implant the resistance heating wire in the groove.

9 Claims, 9 Drawing Sheets

METHOD FOR EMBEDDING RESISTANCE HEATING WIRE IN AN ELECTROFUSION SADDLE COUPLER

FIELD AND BACKGROUND OF THE INVENTION

The present invention relates in general to electrofusion couplers and more particularly, the present invention relates to a method and apparatuses for embedding a resistance heating wire directly into a thermoplastic material, thus forming an electrofusion coupler, such as an electrofusion saddle coupler aimed at connecting together two pipes of thermoplastic material at an angle to one another, one pipe leading into the wall of the other pipe.

Electrofusion couplers, are devices developed to securely couple pipes made of a thermoplastic material, which pipes are intended to carry a liquid or gas such as for example pipes forming a part of a gas (e.g., butane) or water main systems. In general, electrofusion couplers are made of a thermoplastic material in which embedded is a resistance heating wire. Electrofusion coupling involves placing an electrofusion coupler adjacent and pressed against a thermoplastic pipe to be connected thereto and, applying an electrical current through the resistance heating wire, thereby melting the pipe and coupler and firmly welding them together to form a permanent bond therebetween.

Electrofusion coupling (i.e., electrocoupling) of pipes may be broken into two major applications which affect the structure of the couplers employed.

According to a first application, coupled through their ends are at least two pipes, to form a joined continuous pipe. Thus, couplers used in accordance with the first application are characterized by a cylindrical structure to accommodate ends of pipes. An example of an electrofusion coupler aimed at coupling pipes through their ends is disclosed in U.S. Pat. Nos. 4,956,138 and 5,096,632 to Barfield.

According to a second application coupled are two pipes such that the end of one of the pipes is attached to the wall of the other pipe, thereby to form what is known in the art as a T-connection between the pipes. Thus, couplers used in accordance with the second application are characterized by what is known in the art as a saddle structure to accommodate the wall of a pipe. An example of an electrofusion saddle coupler is disclosed in U.S. Pat. No. 4,684,428 to Ewen et al.

An essential feature of both types of electrofusion couplers described above is the resistance heating wire embedded thereat, the wire, when connected typically via metal terminals to an electrical power source produces the heat required for melting and thereby joining together thermoplastic elements such as a pipe and a coupler.

Prior art methods such as ones disclosed in U.S. Pat Nos. 4,956,138 and 5,096,632 to Barfield; 4,684,428 to Even et al.; 4,894,521 to Evans; 4,455,482 to Grandclement; and 4,993,037 to de-Jong, describe manufacturing a preform (e.g., a fusion pad), having a typical disk-shaped structure, made of a thermoplastic material, in which preform embedded is a resistance heating wire typically in a spiral form. Thus produced preform is thereafter used for manufacturing an electrofusion coupler using a suitable mold.

Various methods and apparatuses for embedding a resistance heating wire in thermoplastic elements, typically a preform as described above, were previously described. These include (1) disposing the wire in spiral grooves previously grooved in the preform, as described in U.S. Pat. No. 4,933,037 to de-Jong; U.S. Pat. No. 4,684,428 to Ewen et al.; and U.S. Pat. No. 4,445,482 to Grandclement, the later further describes the use of a spiral mold pattern employed to produce the grooves in the preform; (2) winding an elongated thermoplastic insulated wire in a substantially planar spiral configuration and heating the thermoplastic insulating of the wire to form a disk in which the wire is embedded, heating may be achieved by an electrical current applied to the wire as described in U.S. Pat. No. 4,894,521 to Evans; (3) electrically heating the wire while embedding it into the preform or applying molten plastics to the preform in order to ensure that the wire is fully embedded in the preform, as described in U.S. Pat. Nos. 4,956,138 and 5,096,632 to Barfield; (4) using a cutting tool to form a groove in a surface of a cylindrical element and employing a trailing device connected to the cutting tool, pressing the wire into the groove, the wire than being held in the groove by elastic compression imposed by the groove side walls, as described in U.S. Pat. No. 4,470,193.

However, the methods and apparatuses described above are limited in their use for embedding resistance heating wires in planar (e.g., in a preform disk) or cylindrical structures, yet, these methods are not easily adopted for embedding a wire in more complex structures such as a saddle coupler. Furthermore, when electrofusion coupling is implemented at connecting two thermoplastic elements it is crucial that the elements would form a firm contact therebetween for efficient coupling. Yet, the use of the couplers described above, in which first a preform is manufactured, is limited to pipes matching these couplers only. In addition, these couplers do not provide a user with the ability to select wire structure (e.g., spiral form, diameter etc.) and/or resistance (i.e., heating properties).

The present invention addresses the shortcomings of the presently known configurations described above by providing a method and apparatuses for directly embedding a resistance heating wire in a thermoplastic element such as a saddle coupler. Furthermore, according to the present invention there is no need for a preform of any kind. Therefore, required parameters for specific applications such as wire resistance, shape of thermoplastic element, form of wire insertion and many others may be selected most suitable for any specific application. Thereby more diverse electrofusion capabilities, no longer dependent upon availability of commercially produced electrofusion couplers is provided, diminishing the need of pre manufacturing a wide variety of electrofusion couplers and preforms suitable for various applications, such as, but not limited to, couplers of variable diameters and preforms of various wire characteristics.

There is thus a widely recognized need for, and it would be highly advantageous to have, a method and apparatuses of making electrofusion couplers, which method and apparatuses aimed at embedding a resistance heating wire directly into a thermoplastic element, thereby to overcome the above limitation, and to enable a more diverse use of thus produced electrofusion couplers.

SUMMARY OF THE INVENTION

According to the present invention there is provided an electrofusion saddle coupler and a method and apparatuses for embedding a resistance heating wire directly into a thermoplastic element such as an electrofusion saddle coupler. The method and apparatuses can be used for embedding any type of resistance heating wire in any three-dimensional geometrical configuration in any preexisting thermoplastic element of any shape and therefore to transform such an elements to an electrofusion coupler.

According to further features in preferred embodiments of the invention described below an apparatus for embedding a resistance heating wire in a thermoplastic element having a surface such as an electrofusion coupler, comprising: (a) a first arm having a first operating end and a first longitudinal axis, the first operating end advancing along the first longitudinal axis and the first operating end rotating around the first longitudinal axis; (b) first means for advancing the first operating end; (c) second means for rotating the first operating end; (d) a second arm having a second longitudinal axis and a second operating end, the second arm being deployed in an angle relative to the first arm, the second operating end advancing along the second longitudinal axis and the second operating end rotating around the second longitudinal axis; (e) third means for advancing the second operating end; (f) fourth means for rotating the second operating end; (g) an operating head being connected or integrally formed with the second operating end of the second arm, the advancing and the rotating of the first and second operating ends being for controlling the location in space relative to the surface of the thermoplastic element of the operating head, the operating head including: (i) heat grooving means for creating a groove in the surface of the thermoplastic element; (ii) wire insertion means for inserting the resistance heating wire into the groove.

According to further features in preferred embodiments of the invention described below the method for embedding a resistance heating wire in a thermoplastic element having a surface such as an electrofusion coupler comprising the steps of: (a) providing an operating head including heat grooving means and wire inserting means, the operating head and the thermoplastic element being integratively movable in all directions one relative to the other; (b) using the heat grooving means and the relative movement for creating a groove in the surface of the thermoplastic element; and (c) thereafter using the wire insertion means and the relative movement for inserting the resistance heating wire into the groove, to implant the resistance heating wire in the groove.

According to still further features in the described preferred embodiments the method further comprising the steps of: (d) providing a pressing device being connected to the operating head; and (e) using the pressing device for smoothing the surface of the thermoplastic element after the implantation.

According to still further features in the described preferred embodiments the method further comprising the step of providing an integrative programmable operating system for controlling the relative integrative movement.

According to still further features in the described preferred embodiments the thermoplastic element is selected from the group consisting of an electrofusion saddle coupler, an elbow coupler, a tee-coupler and a branched coupler.

According to still further features in the described preferred embodiments the heat grooving means is a direct application of a concentrated heat onto the surface of the thermoplastic element.

According to still further features in the described preferred embodiments the direct application of a concentrated heat is by a laser beam directed at the surface of the thermoplastic material.

According to still further features in the described preferred embodiments the heat grooving means is a heated tip.

According to still further features in the described preferred embodiments the heated tip is heated by a laser beam.

According to still further features in the described preferred embodiments the wire insertion means include a roller a curved stationary member directing the resistance heating wire into the groove to implant the resistance heating wire in the groove.

According to still further features in the described preferred embodiments the wire insertion means further include a pressing device for smoothing the surface of the thermoplastic element after the implantation.

According to still further features in the described preferred embodiments the apparatus further comprising: (h) an integrative programmable operating system for the controlling of the location in space relative to the surface of the thermoplastic element of the operating head.

According to still further features in the described preferred embodiments the thermoplastic element is an electrofusion saddle coupler.

According to still further features in the described preferred embodiments the apparatus further comprising means for varying the angle between the first and second arms.

According to further features in preferred embodiments of the invention described below the electrofusion saddle coupler, comprising: (a) a thermoplastic element in the form of the saddle coupler, having a surface; (b) a resistance heating wire having a first end and a second end, the wire being embedded in the surface of the saddle coupler in a close winded configuration, wherein the first end is external to the close winded configuration and the second end is internal to the close winded configuration; and (c) a first and a second metal terminals being connected to the first and second ends, respectively, the second metal terminal including an elongation segment to reach the second end.

The present invention successfully addresses the shortcomings of the presently known configurations by providing a method and apparatuses for directly embedding a resistance heating wire in a thermoplastic element such as a saddle coupler, therefore required parameters for specific applications such as wire resistance, shape of element, form of wire insertion and many others may be selected, thereby to provide more diverse electrofusion capabilities no longer dependent upon availability of commercially produced electrofusion couplers, diminishing the need of pre manufacturing a wide variety of electrofusion couplers for various applications.

BRIEF DESCRIPTION OF THE DRAWINGS

The invention herein described, by way of example only, with reference to the accompanying drawings, wherein.

DESCRIPTION OF THE PREFERRED EMBODIMENTS

Figure 1:
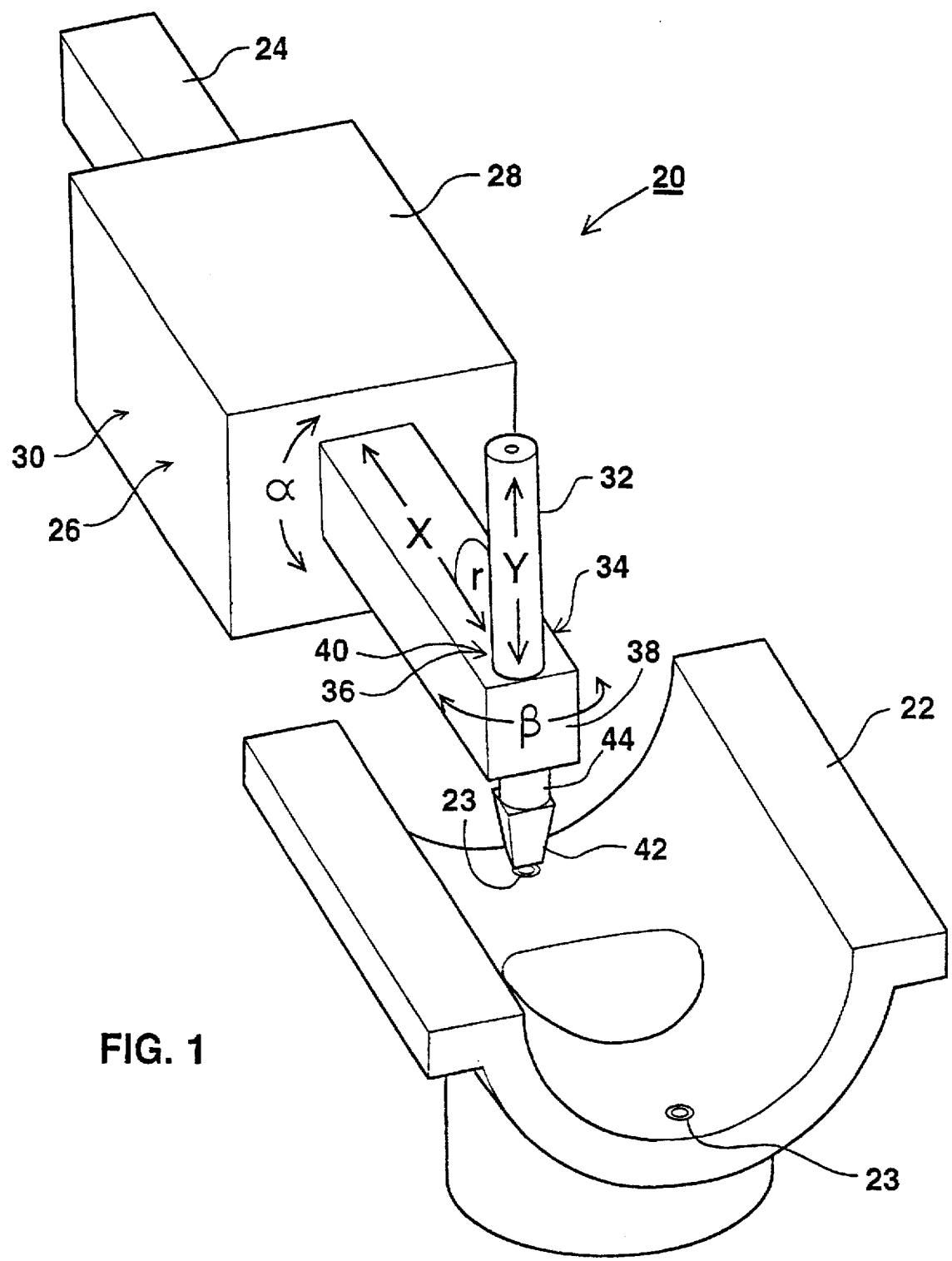
FIG. 1 is a perspective view of an apparatus for embedding a resistance heating wire directly into a saddle coupler to form an electrofusion saddle coupler according to the teachings of the present invention.

The present invention is of a method and apparatuses for embedding a resistance heating wire directly into a thermoplastic element, such as a saddle coupler aimed at connecting together two pipes of thermoplastic material at an angle to one another, one pipe leading into the wall of the other pipe, which method and apparatuses can be used for embedding (i.e., implanting) any type of resistance heating wire in any three-dimensional geometrical configuration. Specifically, the present invention can be used to embed (i.e., implant) a resistance heating wire in a pre existing thermoplastic element of any shape and therefore to transform such an element to an electrofusion coupler.

The principles and operation of a method and apparatuses according to the present invention may be better understood with reference to the drawings and accompanying descriptions.

It should be noted that the method and apparatuses of the present invention may be used for embedding a resistance heating wire in saddle couplers as demonstrated in FIGS. 1-10 described below, yet, as will be apparent to those with skills in the art, the method and apparatuses of the present invention may similarly be used for embedding a resistance heating wire in any other type of coupler including elbow couplers (i.e., L-shaped couplers), tee-couplers (i.e., T-shaped couplers), branched couplers (e.g., Y-shaped couplers), etc.

With reference now to FIGS. 1-4, an apparatus, generally assigned 20, according to the teachings of the present invention is presented. As will be explained in details hereinbelow, apparatus 20 includes features enabling it to directly embed a resistance heating wire 21 of any type (e.g., various diameters, resistances etc.) in any form (e.g., spiral form) in a pre-manufactured thermoplastic element 22 such as a saddle coupler having metal terminals 23 connecting to wire 21 ends, which element 22 may acquire any desired geometrical shape (e.g., saddle curvatures). Thus featuring apparatus 20 enables a user to select wire (e.g., material of made, resistance, diameter, etc.), wire embedding form (e.g., spiral) and element characteristics (e.g., material of made, curvatures, etc.) which best suit any specific application.

Apparatus 20 includes a first arm 24, having a first operating end 38. Operating end 38 is made able to advance back and forth along first arms 24 longitudinal axis X, by first operating end advancing means 26 located, for example in a housing 28. Operating end 38 is further made able to rotate, as indicated by arrow α, around axis X by operating end rotating means 30, which may as well be located in housing 28. It should be noted that the length of operating end 38 relative to the length of first arm 24 may vary. It should be further noted that advancing and rotating operating end 38 may be achieved by advancing and rotating first arm 24 as a whole, as shown in FIGS. 1-4.

Apparatus 20 further includes a second arm 32. Second arm 32, as shown in FIGS. 1-4, is typically deployed substantially vertical to first arm 24, at its operating end 38. Nevertheless it will be appreciated by those with skills in the art that angle γ formed between first 24 and second 32 arms may vary, depending on the specific application, therefore means 34 for varying angle γ may be included in apparatus 20. Similarly to first arm 24, arm 32 has a second operating end 44, made able to advance back and forth along arms 32 longitudinal axis Y, by second operating end advancing means 36 located in, for example, end 38 of first arm 24. Operating end 44 is further made able, as indicated by arrow 6, to rotate around axis Y, by operating end rotating means 40 which may be located as well in end 38 of first arm 24. In FIGS. 1-4 second arm 32 is deployed at the end of first arm 24 however, since the length of operating end 38 of arm 24 may vary, as indicated above, arm 32 may be deployed in any desired location along arm 24. Similarly to as described for operating end 38 of arm 24, advancing and rotating operating end 44, as described above, may be achieved by advancing and rotating arm 32 as a whole, as shown in FIGS. 1-4.

Means 26 and 36 for advancing operating ends 38 and 44, and means 30 and 40 for rotating operating ends 38 and 44, respectively, may acquire various configurations. It is presently preferred that means 26, 36, 30, and 40 will include a suitable gear mechanisms and a motor.

As further shown in FIGS. 1-4, onto operating end 44 of second arm 32 attached is an operating head 42. As will be described below in details, operating head 42 includes means to create a groove 46 in thermoplastic element 22 and to insert resistance heating wire 21 into thus formed grove 46, thereby to implant (i.e., embed) wire 21 in element 22. It should be noted that operating head 42 of arm 32 may be rotated by self rotation means obviating the need to rotate operating end 44. Therefore, when the term 'means for rotating operating head' is used in this document and specially in the claims section, in context of second arm 32, it also refers to the term 'means for rotating operating end'.

Figure 2:
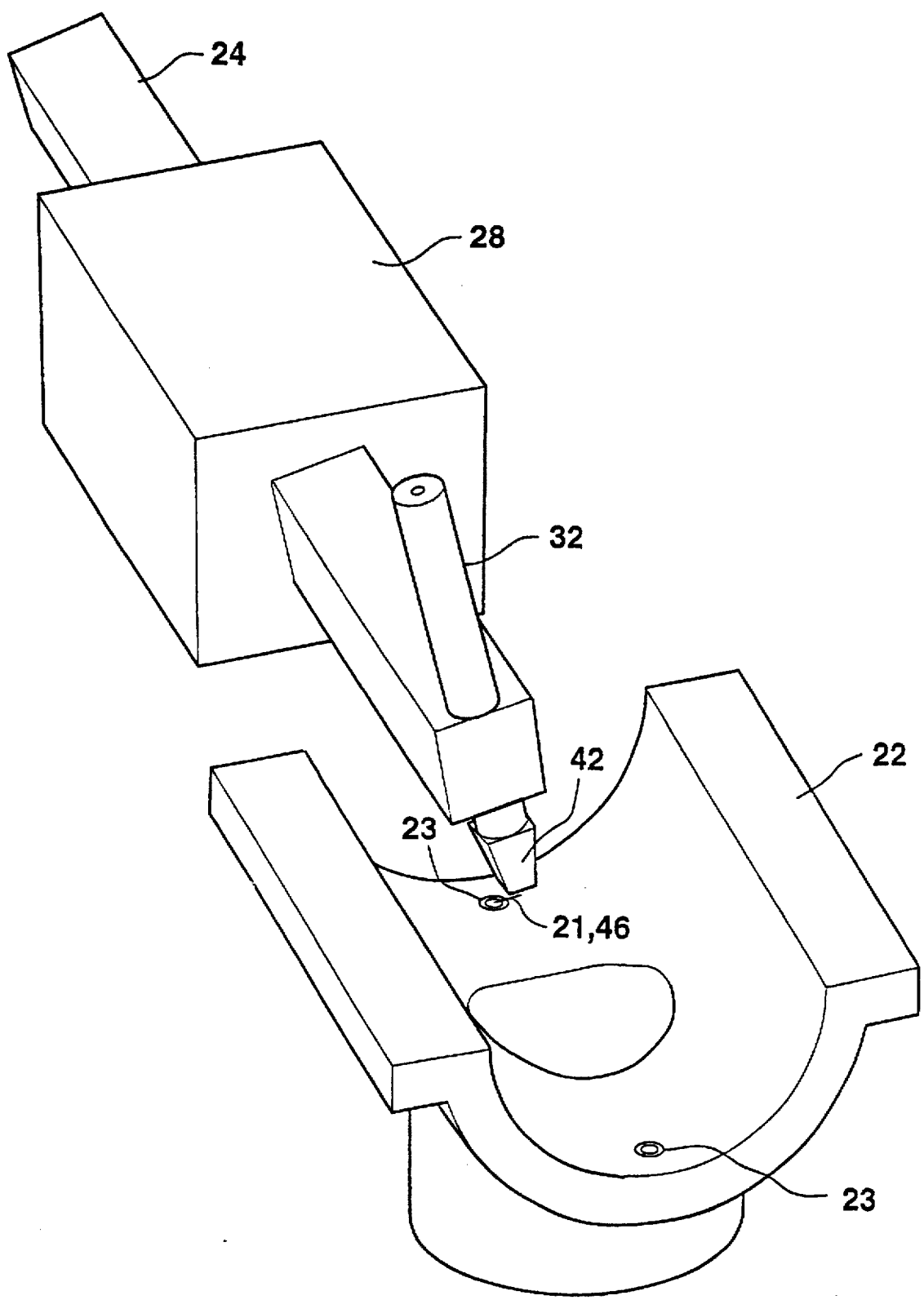
FIG. 2 is a perspective view of the apparatus and coupler of FIG. 1 at a first time point, while operating according to the teachings of the present invention.
Figure 3:
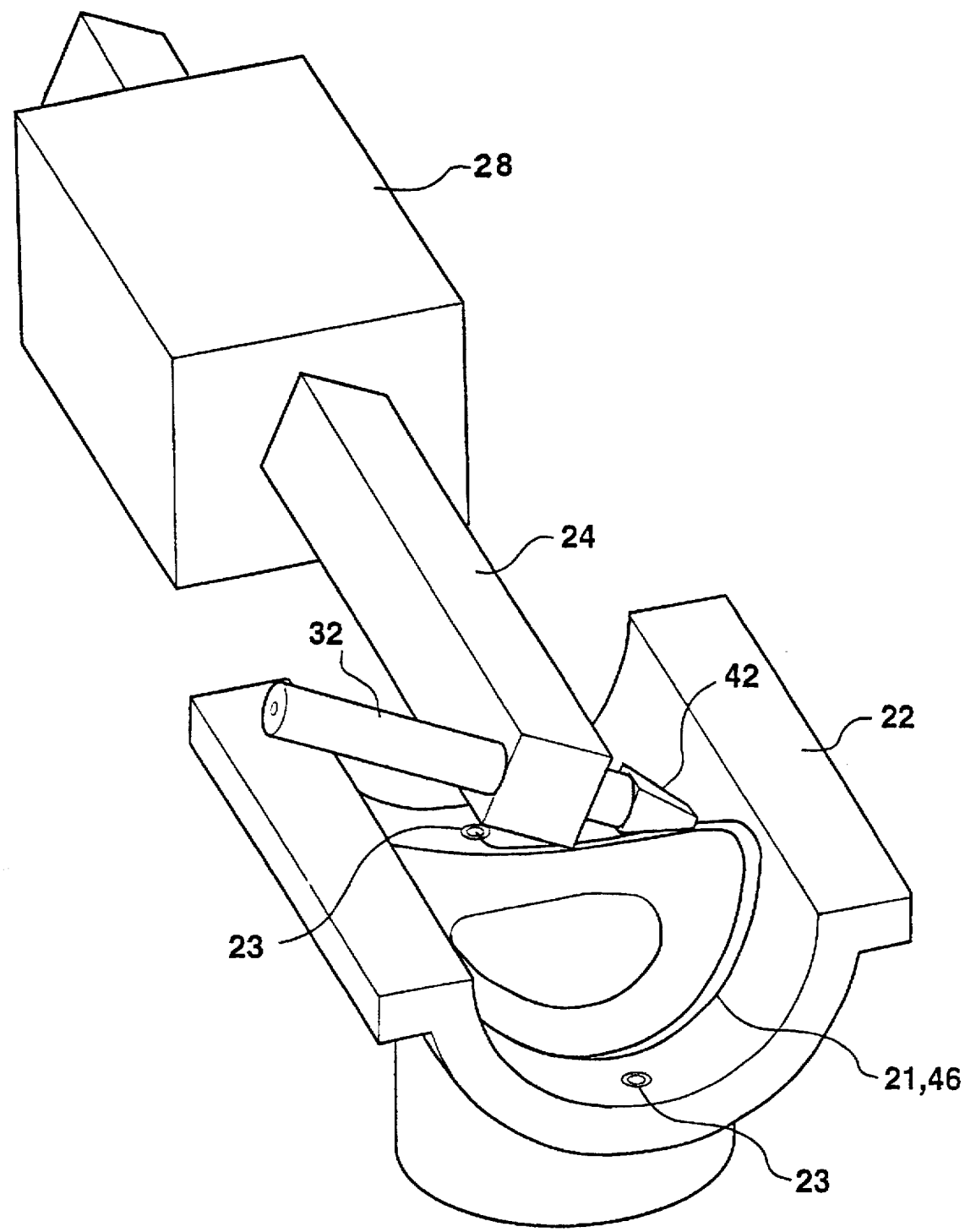
FIG. 3 is a perspective view of the apparatus and coupler of FIG. 1 at a second time point, while operating according to the teachings of the present invention.
Figure 4:
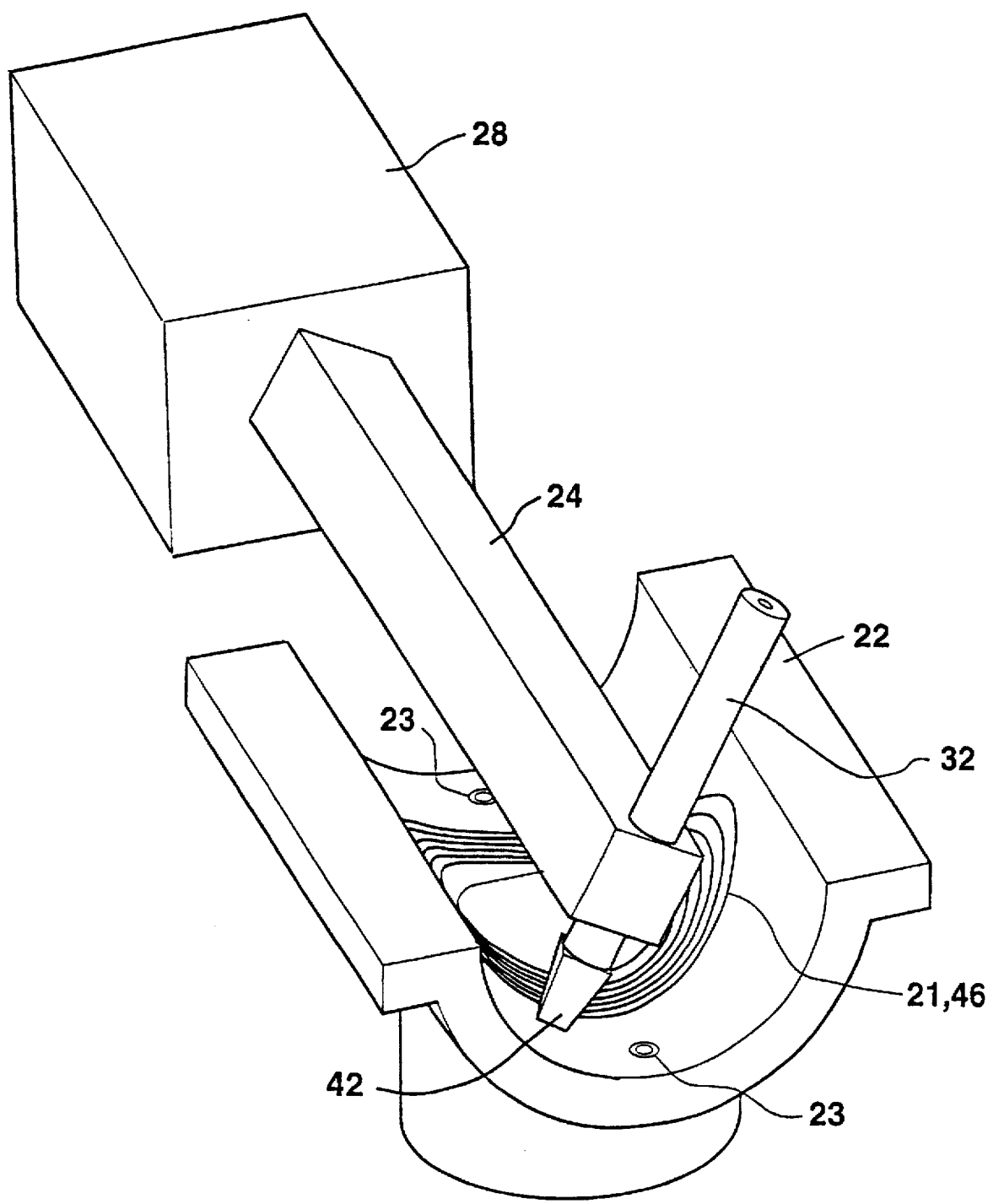
FIG. 4 is a perspective view of the apparatus and coupler of FIG. 1 at a third time point, while operating according to the teachings of the present invention.

As is apparent from the description of apparatus 20 above and shown in FIGS. 2-4, thus advancing and rotating operating ends 38 and 44 of arms 24 and 32, respectively, enables to control the location in space, direction of movement and orientation of operating head 42 relative to the surface of thermoplastic element 22. Therefore, apparatus 20 is suitable to directly implant resistance heating wire 21 into thermoplastic element 22, which element may acquire various three-dimensional shapes and which insertion may acquire various forms, not further limited to planar or circular shapes as are prior art apparatuses described above in the background section.

Above described are four types of movements directly or indirectly associated with operating head 42 of apparatus 20. The reasoning for each of these movements will now be described in details. As is apparent from FIGS. 1-4, advancing and rotating operating end 38 of first arm 24 enable to move arm 32 in a desired path relative to thermoplastic material 22. Advancing operating end 44 of arm 32 enables to maintain operating head 42 in contact with the surface of element 22 and to control the pressure applied by operating head 42 onto the surface, whereas rotating operating end 44 enables to control heads 42 orientation relative to its direction of movement, which, as will shortly be described, is crucial for the operation of apparatus 20.

Figure 5:
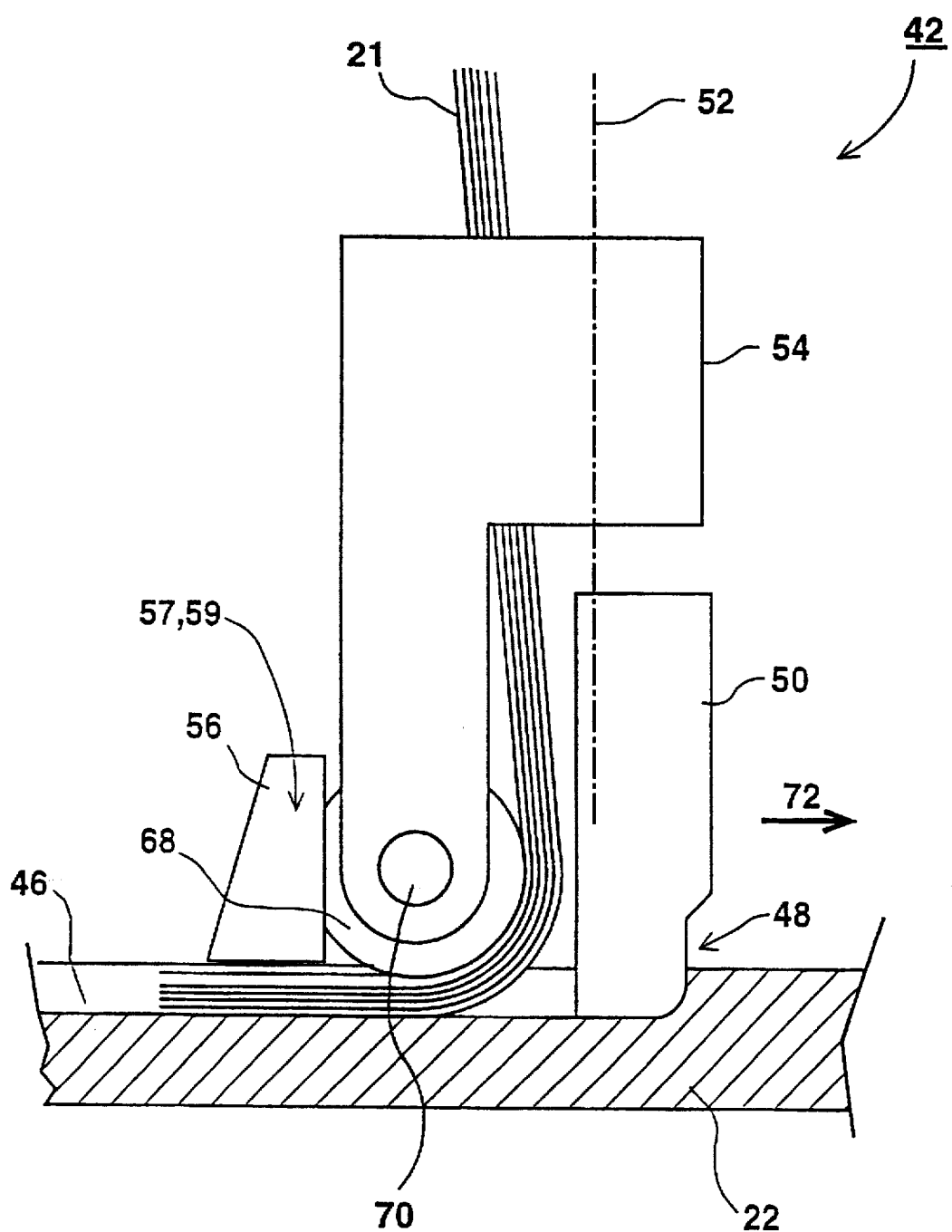
FIG. 5 is a side view of the operating head of the apparatus according to the teachings of the present invention.
Figure 6:
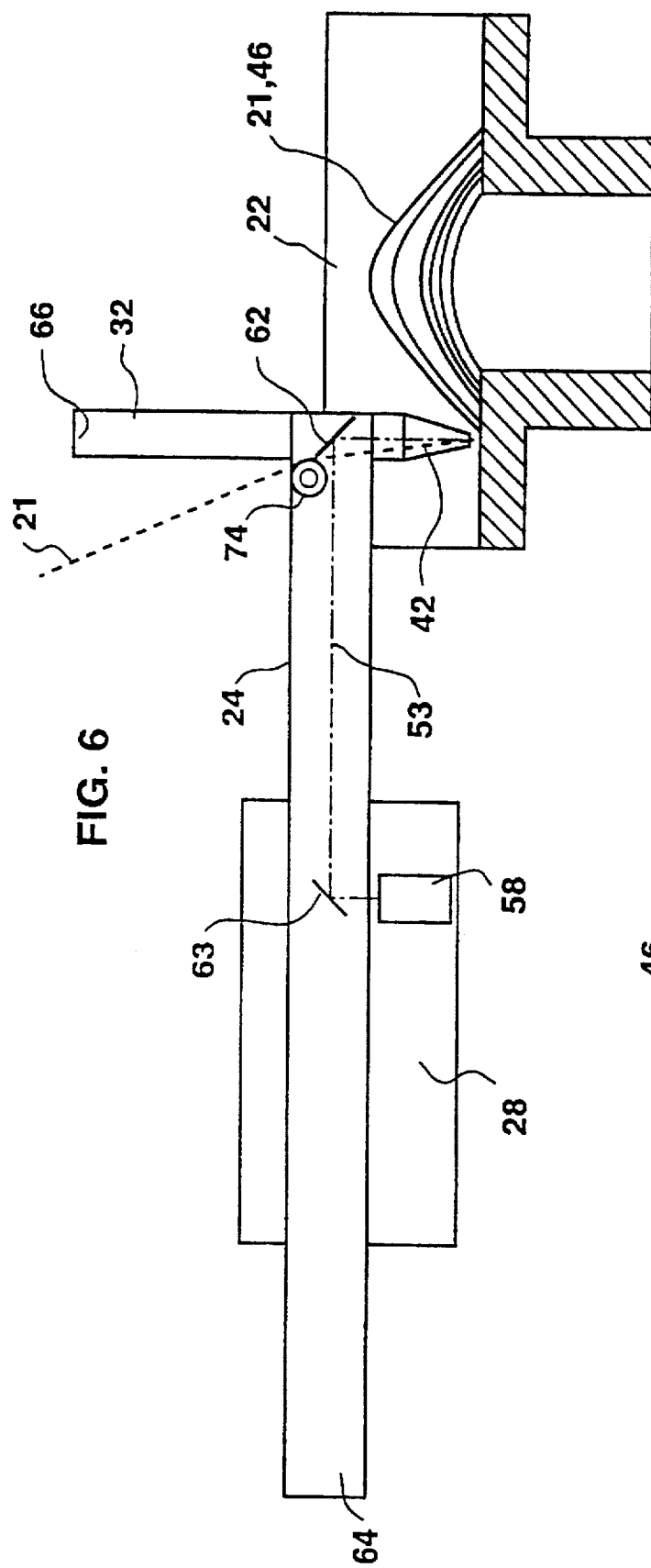
FIG. 6 is a cross section through the apparatus and coupler of FIG. 1.

Reference is now made to FIGS. 5–6, describing specific features and operation modes of operating head 42. As mentioned above, operating head 42 includes means to create a groove 46 in thermoplastic element 22 and to insert resistance heating wire 21 into thus formed grove 46, thereby to implant wire 21 in element 22. As further mentioned above, controlling the location in space of operating head 42 relative to the surface of thermoplastic element 22 is achieved, for example, by advancing and rotating first 24 and second 32 arms of apparatus 20.

Operating head 42 includes a heat grooving means 48 for creating groove 46 in the surface of the thermoplastic element 22; and, a wire insertion means 54 for inserting resistance heating wire 21 into groove 46.

According to one embodiment heat grooving means 48 includes a tip 50 which is heated, for example by a laser beam 52, which heated tip 50 is used to create grove 46 in the surface of element 22 when operating head 42 is pressed against and moved relative to the surface of element 22 by the above described arm operation of apparatus 20. It is obvious to those with skills in the art that other means but laser beam 52 may be used to heat tip 50, which other means include for example making tip 50 from an electricity heat producing material (e.g., a material having a resistance heating wire characteristics, formed as a tip), or alternatively making tip 50 from a good heat transferring material such as a metal and applying external heat to tip 50.

According to another embodiment heat grooving means 48 involve a direct application of concentrated heat onto the surface of element 22, which direct application of heat may be achieved for example by directing laser beam 52 directly onto the surface of element 22, or alternatively directing a focused stream of hot gas (e.g., air) or an ignited gas (i.e., a flame) onto the surface of element 22.

As shown in FIG. 6, a laser beam generator 58 located in for example housing 28 and laser beam reflecting devices (e.g., mirrors) 63 and 62 located in first 24 and second 32 arms, respectively, may generate and lead laser beam 52 to operating head 42. Nevertheless, other configurations such as for example including laser beam generator at end 64 or within first arm 24 aided by mirror 62 or alternatively including laser beam generator 58 at end 66 or within first arm 24. Other locations of laser beam generator 58 are also possible provided that suitable laser beam reflecting devices will direct laser beam 52 to operating head 42. In some cases however it may be required to control the reflecting angles of the laser beam reflecting devices.

As shown in FIG. 5, wire insertion means 54 for inserting resistance heating wire 21 into groove 46 may for example include a roller 68 engaged via hinge 70 to wire insertion means 54. Roller 68 may rotate around hinge 70 and roller 68 is disposed relative to groove 46 such that while operating head 42 advances in a direction indicated by arrow 72 in FIG. 5, wire 21 is inserted into groove 46, thus being embedded (i.e., implanted) in thermoplastic element 22. As is apparent to those with skills in the art, alternatively to roller 68 wire insertion means may include a curved stationary member which, unlike roller 68, is not rotatable, yet still functions in directing wire 21 into groove 22. As further shown in FIG. 5, wire insertion means 54 may optionally include a pressing device 56 for smoothing the surface of thermoplastic element 22 after the implantation of wire 21 thus described. Included, for example in pressing device 56 may be a wire cutter 57 and a wire gripper 59 and, as shown in FIG. 6, directing wire 21 into operating head 42 may be assisted by a wire leading wheel or another suitable curved assembly 74.

As described above, operating head 42 is characterized by a non-symmetrical structure. For the appropriate operation of operating head 42 it is crucial that grooving means 48 will be ahead of wire insertion means 54 in the direction of movement of operating head 42, at all times. As explained above, this is achieved by a controlled rotation of operating head 42 by rotation means 40, which controlled rotation ensures that grooving means 48 will be ahead of wire insertion means 54 as required. It is understood to those with skills in the art that the distance between grooving means 48, insertion means 54 and pressing device 56 may vary according to the specific application. It is further understood that apparatus 20 may include exchangeable operating heads, including one having grooving means and another having wire insertion means.

Figure 7:
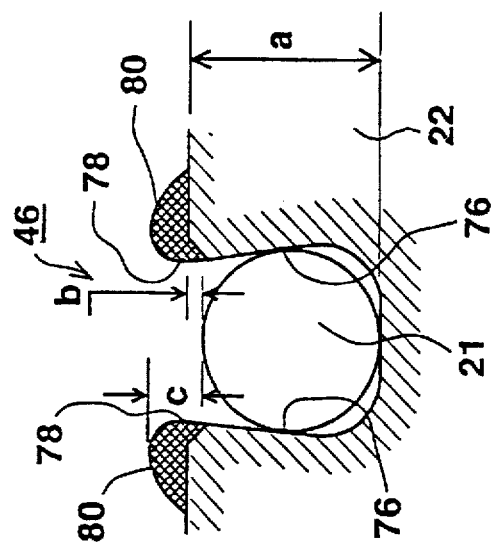
FIG. 7 is a cross section through a groove formed by the apparatus of the present invention in the surface of a thermoplastic element and of a resistance heating wire inserted into the groove and thereby embedded in the element.

With reference now to FIG. 7 presented is a cross section through groove 46 formed by apparatus 20 in thermoplastic element 22, which groove includes wire 21. By controlling the speed of movement of operating head 42, and other parameters associated with it such as, but not limited to, the amount of heat applied to the surface of element 22; the exact shapes of tip 50 and pressing device 56 (when present), their orientations relative to one another and relative to the surface of thermoplastic element 22; etc., a user can control various parameters characterizing groove 46. Hence, for example, groove 46 may be formed having inwardly inclined walls 76 to assist retaining wire 21 within groove 46. In addition the depth (marked as a in FIG. 7) of groove 46 may be controlled, taking into account the depth of wire 21 relative to edges 78 of groove 46 (marked as b in FIG. 7). Furthermore, ribs 80 running along groove 46 for further support of wire 21 within groove 46 may be thus formed and their height relative to edges 78 of groove 46 (marked as c in FIG. 7) controlled.

Figure 8C:
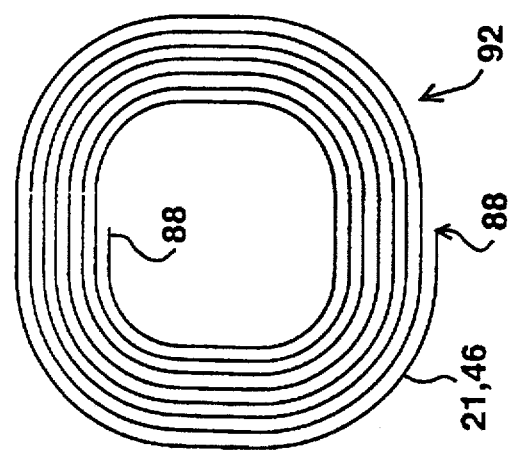
FIGS. 8a, 8b and 8c are top views of three configurations of embedding a resistance heating wire in a thermoplastic element.
Figure 8A:
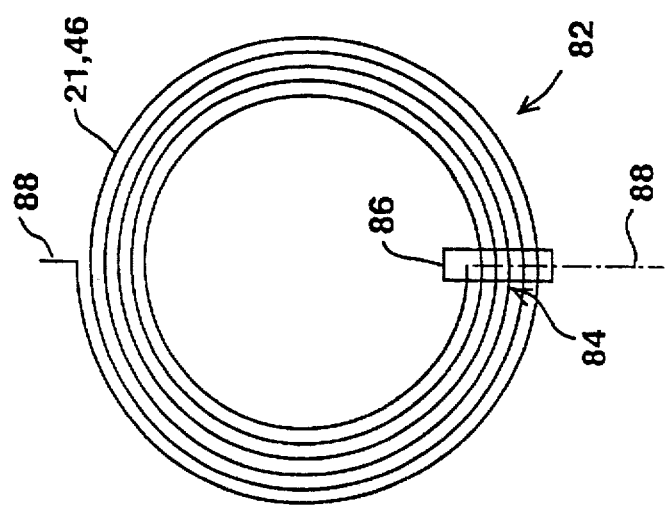
Figure 8B:
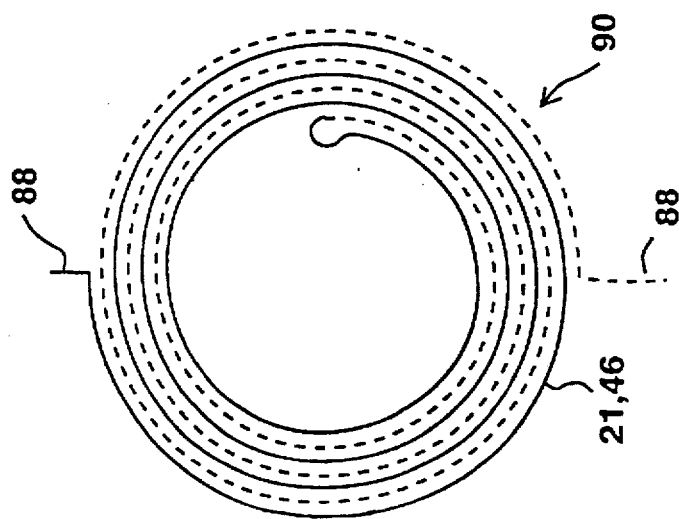

With reference now to FIGS. 8a–c and FIGS. 9a–b. In FIGS. 8a–c, presented are three top views of possible configurations of embedding a resistance heating wire in a groove formed in a thermoplastic element. The configuration shown in FIG. 8a is the one currently used in electrofusion saddle couplers manufactured with a preform as described in the background section above. According to this configuration, groove 46 and wire 21 acquire a spiral form 82. In this case the most inner turn of wire 21 must cross-over spiral form 82, if both wire ends 88 are to be located outside of spiral form 82. However, thus crossing-over creates a single sided hot spot 84, extensively heating, and therefore melting, an electrical insulation bridge 86, typically made of a thermoplastic material, located between spiral form 82 and the cross-over, leading to the formation of an electrical connection between the cross-over and spiral form 82 and hence to an electrical shortage and either premature or less controlled termination of the electrocution process. This is obviously a great disadvantage of this configuration. According to the configuration presented in FIG. 8b groove 46 and wire 21 acquire a bi-spiral form 90 so both ends 88 of wire 21 are external of bi-spiral form 90. According to the configuration presented in FIG. 8c, groove 46 and wire 21 may acquire other spiral forms, such as but not limited to a substantially square spiral form 92 to achieve an application specific optimal form which will than satisfy specific heating requirements. The apparatuses and method of the present invention are most suitable of inserting wire 21 into thermoplastic element 22 in any of the configurations shown in FIGS. 8a–c. Furthermore, the apparatuses and method of the present invention are capable of inserting wire 21 into thermoplastic element 22 in any other desirable close winding configurations, such as ones created by a linear raster movement, etc.

Figure 9A:
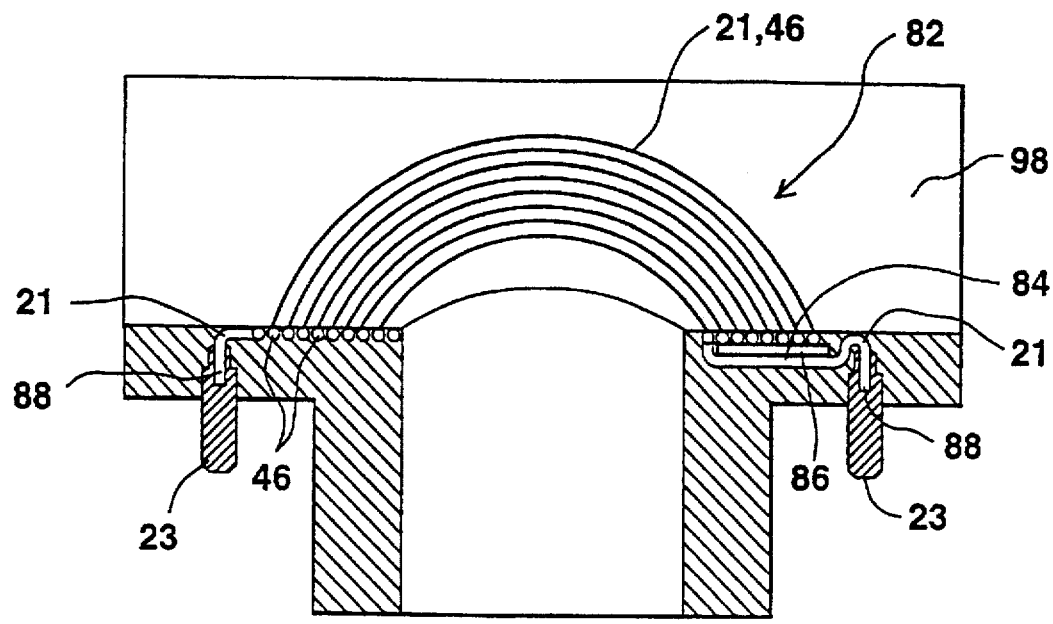
FIGS. 9a and 9b are cross-sections through two configurations of electrofusion saddle couplers produced according to prior art methods and according to the present invention, respectively.

FIG. 9a presents a cross-section through a prior art electrofusion saddle coupler 98 in which wire 21 is embedded in the configuration of spiral form 82 of FIG. 8a. As mentioned, in this case thermoplastic bridge 86 is used to insulate the cross-over region of wire 21 from spiral form 82 while electrofusion is performed by connecting wire ends 88 to electrical power source via metal terminals 23. However when bridge 86 melts due to the formation of hot spot 84, as described above, the electrical circuit is disconnected and the electrofusion process terminates.

Figure 9B:
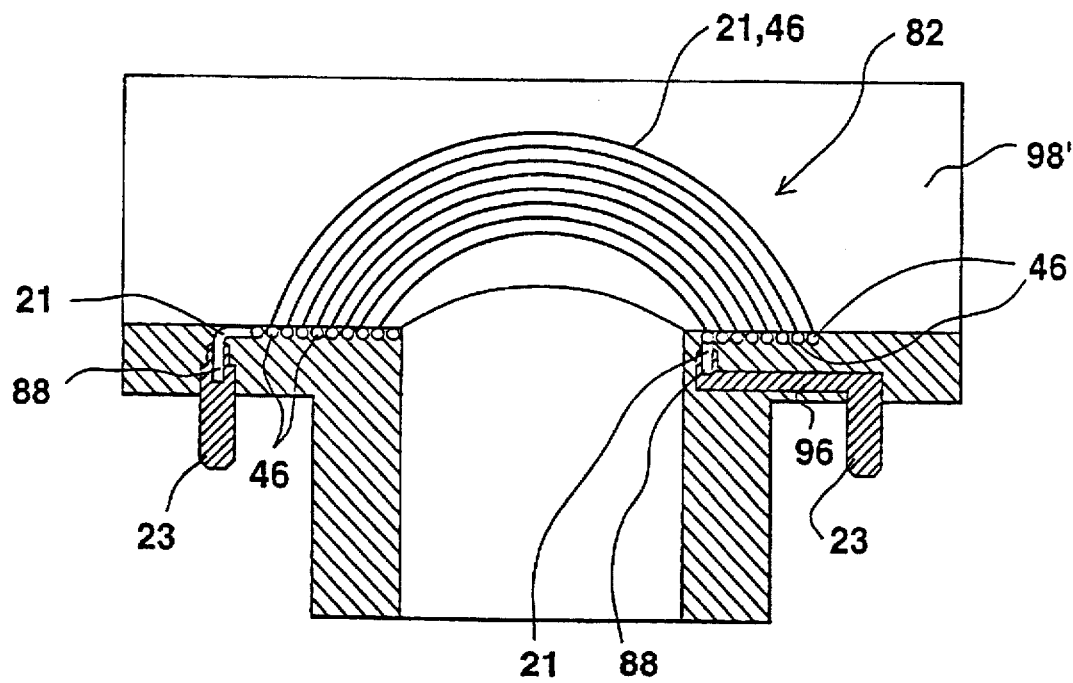

FIG. 9b, on the other hand, shows a cross-section through an electrofusion saddle coupler 98' in which wire 21 follows a groove 46 having a form similar to the one presented in FIG. 8a but lacking cross-over such that one wire end 88 is located external to spiral form 82 whereas the other is internal. In this case an elongation segment 96 is to be provided connected to or integrally formed with one of metal terminals 23 to engage end 88 located at the innermost turn of spiral form 82. It is hereby suggested for the first time to include an elongation segment instead of a thermoplastic bridge in electrofusion saddle couplers. This configuration is more suitable for electrofusion coupling since the formation of a hot spot is eliminated by appropriate selection of the electrical-heating characteristics of elongation segment 96. Thus, selecting elongation segment 96 with a large cross-section and or low electrical resistance will ensure that a hot spot will not be formed during the electrofusion process, and therefore the duration of the process is under a better control. According to the present invention electrocution saddle coupler having an elongation segment such as coupler 98' of FIG. 9b described above may be manufactured by any of the prior art methods and apparatuses, as well as the method and apparatuses of the present invention.

Figure 10:
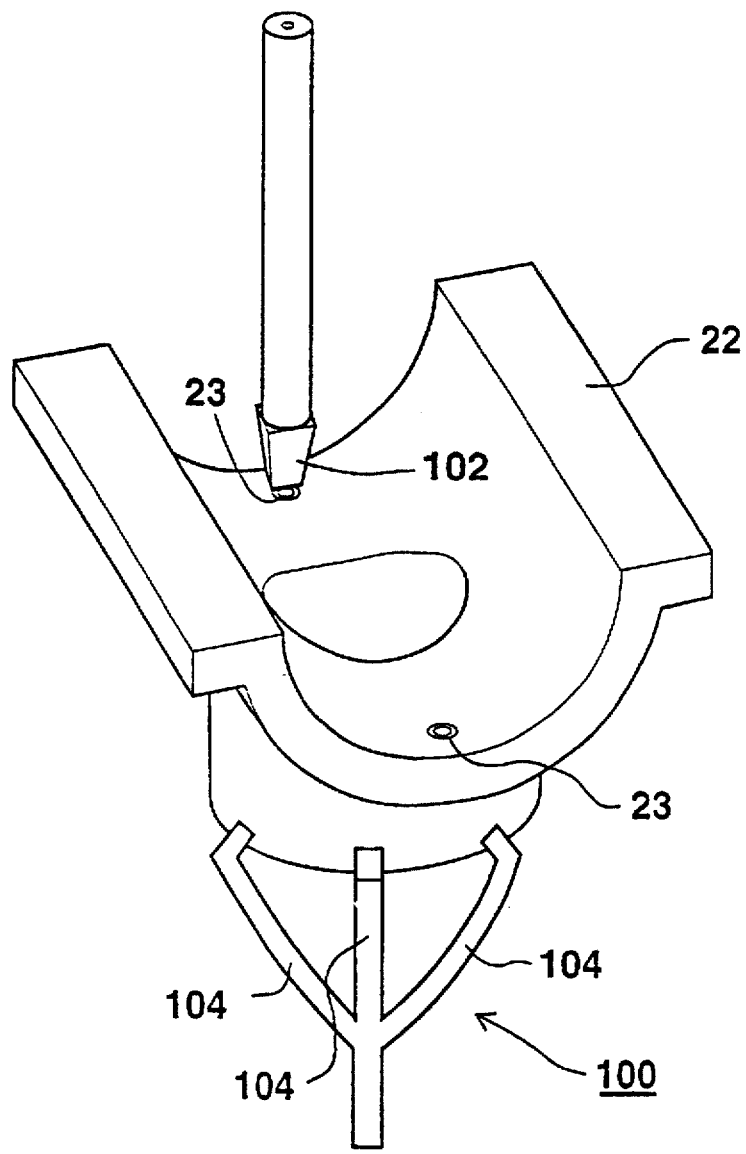
FIG. 10 is a perspective view of another apparatus for embedding a resistance heating wire directly into a saddle coupler to form an electrofusion saddle coupler according to the teachings of the present invention.

Reference is now made to FIG. 10. From the above description and Figures it is clear that by moving operating head 42 of apparatus 20 relative to the surface of thermoplastic element 22 it is possible to create groove 46 in element 22 and to insert wire 21 into thus formed groove 46. As shown in FIG. 10, similar result may however be achieved by an apparatus, generally assigned 100, capable of moving thermoplastic element 22 in a mirror movement relative to a fixed operating head 102, having structural features similar to those of operating head 42 described above. Thus, apparatus 100 includes one or more gripping means 104 to grip thermoplastic element 22 and enables to move element 22 in a mirror movement, as compared with the movement imposed by apparatus 20, relative to fixed operating head 102. It should however be noted that the relative movement between an operating head and a thermoplastic element may be achieved by a dual contribution of both an apparatus enabling some of the movements characterizing operating head 42 of apparatus 20 and an additional apparatus imposing the complement movements on element 22 to achieve the required relative movement of the head and the element.

As mentioned, controlling the speed of relative movement of the operating head, and other parameters associated with it such as, but not limited to, the amount of heat applied to the surface of element 22; the orientations of tip 50 and pressing device 56 (when present) relative to one another and relative to the surface of thermoplastic element 22; etc., enables a user to control various parameters characterizing groove 46 such as its cross-section and global shape. Thus controlling the operation modes of apparatuses according to the present invention is preferably achieved by an integrative programmable operating system.

The above described apparatuses provide means for moving an operating head relative to a thermoplastic element such that the operating head is able to be in any relative location, orientation and direction of movement with respect to the element, such that a wire may be inserted into a groove formed in the surface of the element similarly to as described above. It is obvious that similar mechanical movements of the operating head relative to the element may be achieved in various different ways.

According to the present invention further provided is a method for embedding a resistance heating wire in a thermoplastic element such as an electrofusion coupler, which method is preferably implemented using any of the above described embodiments of apparatuses 20 or 100 or their combination, and includes:

(a) providing an operating end including heat grooving means and wire inserting means, the operating head and the thermoplastic element being integratively movable in all directions one relative to the other;

(b) using the heat grooving means and the relative movement of the operating head and the thermoplastic element for creating a groove in the surface of the thermoplastic element; and (c) thereafter using the wire insertion means and the relative movement of the operating head and the thermoplastic element for inserting the resistance heating wire into the groove, to implant the resistance heating wire in the groove.

The method may further include:

(d) providing a pressing device being connected to said operating head; and, (e) using said pressing device for smoothing the surface of the thermoplastic element after said implantation.

The method of the present invention is preferably implemented using an integrative programmable operating system for controlling thus described relative integrative movement in all directions of the thermoplastic element and of the operating head, and for controlling any other desired parameter of apparatuses 20 or 100.

It is clear to those with skills in the art that implementing the method of the present invention may be achieved using the apparatuses described hereinabove, as well as various modifications of these apparatuses.

While the invention has been described with respect to a limited number of embodiments, it will be appreciated that many variations, modifications and other applications of the invention may be made.

What is claimed is:

1. A method for embedding a resistance heating wire in a saddle-like thermoplastic element having a curved surface, the method comprising the steps of:

(a) providing an operating head including heat grooving means including a heated tip, and wire inserting means, said operating head and the thermoplastic element being actively and concurrently movable in at least one of X, Y, $\alpha$, $\beta$ and $\gamma$ directions one relative to the other;

(b) using said heated tip of said heat grooving means and relative movement for creating a groove in the surface of the thermoplastic element, said heated tip dictating a shape and a depth of said groove; and (c) thereafter using said wire insertion means and said relative movement for inserting the resistance heating wire into said groove, to implant the resistance heating wire in the groove.

2. A method as in claim 1, further comprising the steps of:

(d) providing a pressing device being connected to said operating head; and (e) using said pressing device for smoothing the surface of the thermoplastic element after said implantation.

3. A method as in claim 2, further comprising the step of:

(f) providing an integrative programmable operating system for controlling said movability in said X, Y, α, β and γ directions, and thereby control said relative movement.

4. A method as in claim 2, wherein the saddle like thermoplastic element is an electrofusion saddle coupler.

5. A method as in claim 1, wherein said heated tip is heated by a laser beam.

6. A method as in claim 1, wherein said wire insertion means includes a roller directing the resistance heating wire into said groove to implant the resistance heating wire in the groove.

7. A method as in claim 1, wherein said wire insertion means includes a curved stationary member directing the resistance heating wire into said groove to implant the resistance heating wire in the groove.

8. A method as in claim 1, further comprising the step of:

(d) providing an integrative programmable operating system for controlling said relative movement.

9. A method as in claim 1, wherein the saddle like thermoplastic element is an electrofusion saddle coupler.

* * * * *